C. R. RAWDON & F. McCOOLE.
APPARATUS FOR RECOVERING PRECIOUS METALS.
APPLICATION FILED DEC. 18, 1916.
1,228,133.
Patented May 29, 1917.
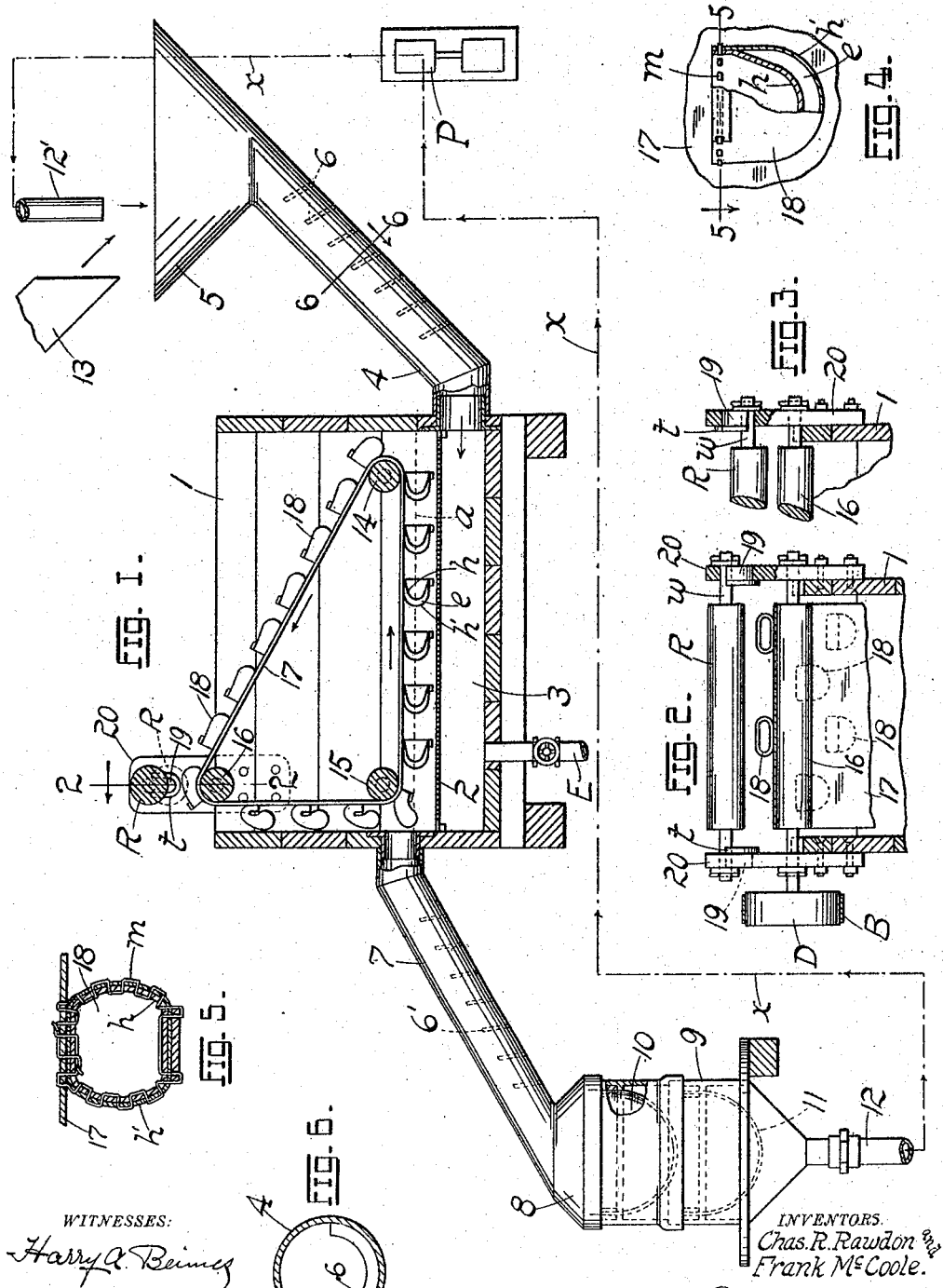
WITNESSES:
INVENTORS.
Chas. R. Rawdon
Frank McCoole.
BY
ATTORNEY.

UNITED STATES PATENT OFFICE.

CHARLES R. RAWDON AND FRANK McCOOLE, OF ST. LOUIS, MISSOURI.

APPARATUS FOR RECOVERING PRECIOUS METALS.

1,228,133.

Specification of Letters Patent.   Patented May 29, 1917.

Application filed December 18, 1916.   Serial No. 137,613.

*To all whom it may concern:*

Be it known that we, CHARLES R. RAWDON and FRANK McCOOLE, citizens of the United States, residing at St. Louis, State of Missouri, have invented certain new and useful Improvements in Apparatus for Recovering Precious Metals, of which the following is a full, clear, and exact description, reference being had to the accompanying drawings, forming a part hereof.

Our invention has relation to improvements in apparatus for recovering precious metals; and it consists in the novel features of construction more fully set forth in the specification and pointed out in the claims.

The present invention is directed to apparatus for treating auriferous sands, tailings, and gangue in which the particles of gold are too fine to be recovered by usual methods of treatment, the invention being specially adapted for recovering flour gold when occurring either alone or when associated with coarser particles recoverable by ordinary methods. The object of the invention is to provide an apparatus which may successfully operate with either water or liquid hydrocarbons such as gasolene and the like, gasolene being particularly desirable on account of its low specific gravity, and readiness with which it segregates the float or flour gold from the gangue, sands or foreign mineral particles with which it may be associated, such segregation or separation being due to the fact that the heavier mineral and earthly particles readily sink in the light liquid on the surface of which however the flour gold readily floats. A further object is to provide an apparatus in which the recovery of the flour (and other) gold may be continuous, the apparatus being in a sense self-contained and involving a mechanical process which in a sense is cyclical, the same liquid being used over and over again, barring of course the losses due mainly to evaporation. The invention presents advantages which will be readily apparent from the following detailed description in connection with the accompanying drawings in which—

Figure 1 is a part side elevation and part vertical longitudinal middle section of the apparatus; Fig. 2 is a vertical cross-section on the line 2—2 of Fig. 1; Fig. 3 is a view similar to Fig. 2 showing however, the squeezing roller in operative position; Fig. 4 is an enlarged plan view of one of the skimming bags or dippers and belt carrying same, parts being in section; Fig. 5 is a cross-section on the line 5—5 of Fig. 4; and Fig. 6 is a cross-section on the line 6—6 of Fig. 1.

Referring to the drawings, 1, represents a suitable tank or container provided with a perforated screen or plate 2 raised a suitable distance above the bottom of the tank, the stream charged with the metal to be recovered being fed to the chamber 3 below the screen from a feed-pipe 4 tapping the bottom of one of the vertical walls of the tank, the upper end of the pipe being provided with a feed hopper 5. The inner walls of the pipe (or equivalent conduit) 4 are provided with a series of riffles 6 to intercept metallic particles too heavy to float in the liquid hydrocarbon, water, or other medium with which the fine sands are mixed while being charged into the hopper 5. Tapping the wall of the tank above the screen 2 and opposite from the discharge end of the feed-pipe 4 is a discharge pipe or conduit 7 likewise provided with riffles 6', the lower end of the discharge pipe terminating in a flaring member 8 forming the hood or top of a receptacle 9 designed to intercept the last traces of flour or float gold as presently to more clearly appear. The receptacle 9 is provided with bags 10 and 11 superposed over one another and spaced apart, the upper bag being preferably of comparatively coarse texture such as felt or its equivalent while the lower bag 11 is of denser material or texture such as chamois or its equivalent. The receptacle 9 is provided with a bottom discharge pipe 12 from which the liquid freed from the metal and sands is conducted back to the hopper 5 as shown by the line of flow indicated by $x$, the discharge 12' from said line being in proximity to the discharge end of the chute 13 from which the gold-bearing sands are delivered to the hopper 5, the sands and liquid thoroughly mixing before entering the pipe 4. To cause the liquid to circulate through the line 12—12', any conventional pump P may be employed for the purpose.

Disposed across the tank 1 above and in proximity to the screen 2 at opposite ends of the tank are rollers 14, 15; and at the top of the tank above the roller 15 is a roller 16, the latter being equipped outside the tank with a drive pulley D driven by a belt B as shown. Over the rollers referred to travels an endless belt 17 whose bottom horizontal lap travels a slight distance above the level $a$ of the liquid in the tank, the outer face of the belt being equipped with a series of skimming bags or dippers 18 which dip beneath the surface $a$ of the liquid and collect the flour gold floating on the surface, the liquid discharging back into the tank after the bags pass over the roller 16, allowing the gold particles to adhere to the fabric of which the bags are composed. Preferably, the bag is a composite one, that is to say, it is composed of an inner bag $h$ of felt or equivalent material having a loose texture, and an outer bag $h'$ of denser material or close texture such as chamois or its equivalent, the two bags being held together at their edges by lacing or a string $m$ which may be removed at any time to permit of a separation of the bags for the purpose of removing from the inner surface of the outer bag the finer gold particles which find their way through the pores or meshes of the coarser inner bag. The inner bag $h$ is somewhat smaller than the outer so as to leave a space or compartment $e$ for the accumulation of the gold particles. Where water is used as the liquid to be mixed with the sands, it becomes necessary to squeeze the water out of the skimming bag, but where a light hydrocarbon liquid such as gasolene is employed, the latter runs through the fabric of the bag and does not need squeezing out. To wring out the bags a squeezing roller R may be employed to coöperate in conjunction with the roller 16. The trunnions of the roller R are mounted in bushings 19 inserted into vertically elongated openings or slots in the posts 20 on the tank, each bushing being provided with a limiting flange $t$ engaging the inner face of the post. The bushing does not entirely fill the slot which receives it, there being always sufficient space between the bearing surface of the bushing and the end of the slot to allow for the passage therethrough of the trunnion $w$ of the roller. It follows therefore that when the bushings are turned in one direction the trunnions or roller spindles $w$ will rest in the seats or depressions of the bushings raising the roller R sufficiently above the roller 16 to allow for the free passage of the bags 18 between the rollers (Figs. 1, 2). When the bushings are turned upside down however, the trunnions $w$ will then rest on the bottoms of the slots, the depressions of the bushings engaging the upper peripheral portions of the trunnions (Fig. 3). This has the effect of lowering or bringing the roller R into such close proximity to the roller 16 that the bags can no longer pass freely through the space between the rollers and the bags will consequently be squeezed between the rollers and the water expelled therefrom.

The operation is substantially as follows: Let us assume that gasolene is used as the liquid for floating or sustaining the flour gold or metal to be recovered. The charge of auriferous sand or crushed rock or tailings from old and abandoned dump heaps is fed from the chute or spout 13 into the hopper 5, the sands mingling with the gasolene stream issuing from the pipe 12'. The mixture or pulp traverses the pipe 4 where the heavier gold particles if any be present, sink and are intercepted by the riffles 6. The stream passes into the chamber 3 below the screen 2 which holds back the sands and gangue allowing the liquid with its suspended and floating particles of flour gold to pass through, the level of the liquid indicated by the line $a$ being maintained substantially constant by reason of the discharge thereof into the pipe 7. The belt 17 having movement imparted thereto in the direction indicated by the arrows in Fig. 1, causes the bags or skimming buckets 18 to dip slightly below the level $a$ of the liquid and thus pick up the floating particles, the gasolene scooped up by the buckets running out through the meshes or fabrics of the component bags $h$, $h'$, back into the tank 1. The coarser particles of the flour gold adhere to the looser textured bag $h$, the finer passing into the compartment $e$ between the bags and being intercepted by and collected on, the inner surface of the denser bag $h'$. At intervals the lace string $m$ is removed, the bag sections $h$, $h'$, are separated and their contents removed for further treatment in any way known to the art. With this subsequent treatment our invention is not concerned, the same being limited to the apparatus and process of skimming the particles as they float on the surface of the liquid employed. Gold particles which have escaped the reach of the bags and have entered the pipe 7 are intercepted by the bags or porous diaphragms 10 and 11 in the receptacle 9, the coarser particles adhering to the bag 10, the finer, which have passed through said bag, being intercepted by the bag 11. Any particles which are too heavy to float on the surface and which as a result of undue agitation in the tank 1 have escaped from said tank are caught by the riffles 6' in the pipe 7. By the time the gasolene has filtered through the last bag 11 it is sufficiently clean to be used over again, being returned through the flow line $x$ back to the pipe 12', the operation thus being continuous. The several parts are made detachable as shown so that ready access may be had to the tank 1, pipes 4, and 7 and receptacle 9, the several parts being shown more or less conventionally without any attempt at mechanical details. Such details the skilled mechanic is familiar with and a showing thereof in the present connection is unnecessary. Where water is employed in lieu of gasolene, the squeezing roller R is brought into service as already described.

We do not of course wish to be limited to the use of gasolene among the liquids of lower specific gravity than water, and we desire it to be understood that any liquid capable of sustaining the flour gold (or other metal) at or near the surface within reach of suitable skimming devices is within the contemplation of our invention. Again, we do not wish to be limited to the material or fabric which compose the skimming bags or bag components, and while we have here referred to felt and chamois as entering into the structure of the bags, these materials are merely by way of example. Many other changes, obvious to the skilled mechanic may be resorted to without a departure from the spirit or essence of our invention. Where the liquid mass has a flow imparted thereto as in the tank 1, the skimmers or bags should pass over the liquid in a direction contrary to the direction of flow of the liquid, to make the skimming effective. The particles recovered or skimmed need not of course be restricted to flour gold, since the apparatus may be used to recover any values, be the same metal in the native state or as mineral. We do not wish to be limited to only two members such as $h$, $h'$, to a bag, any plurality of individual bags nested together and secured together along their edges being within the scope of our invention. To permit discharge of the sands from the tank 1, a suitable drain pipe E is provided as shown in Fig. 1.

Having described our invention what we claim is:

1. In an apparatus of the character described, a tank having intake and discharge means at different levels, a perforated screen or diaphragm disposed in a plane between the intake and discharge, an endless belt mounted in the tank above the screen and having a bottom lap disposed slightly above the level of the liquid traversing the tank, a series of porous buckets mounted on the belt and operating to dip slightly below the surface of the liquid to gather or skim the metal values sustained by the liquid body.

2. In an apparatus of the character described, a tank having intake and discharge means at different levels, a perforated screen disposed in a horizontal plane between the intake and discharge, an endless traveling belt mounted in the tank above the screen and passing over a series of rollers disposed across the tank, one of said rollers being a driving roller, the belt having a bottom horizontal lap traveling in proximity to the surface of the liquid in the tank, a series of porous bags disposed across the belt and operating to dip below the surface of the liquid in the tank for skimming or gathering the values sustained by the liquid within reach of the bags.

3. In an apparatus of the character described, a tank having intake and discharge means at different levels, a perforated screen or diaphragm disposed in a plane between the intake and discharge, an endless belt mounted in the tank above the screen and having a bottom lap disposed slightly above the level of the liquid traversing the tank, a series of porous fabric buckets mounted on the belt and operating to dip slightly below the surface of the liquid to gather or skim the metal values sustained by the liquid body, and means in the path of travel of the buckets for squeezing the liquid therefrom upon their emergence from the liquid in the tank.

In testimony whereof we affix our signatures in presence of two witnesses.

CHARLES R. RAWDON.
FRANK McCOOLE.

Witnesses:
EMIL STAREK,
JOS. A. MICHEL.

Copies of this patent may be obtained for five cents each, by addressing the "Commissioner of Patents, Washington, D. C."